United States Patent

[11] 3,588,809

[72] Inventor Archibald S. Devlin
 R.R. #2, Hull, Quebec, Canada
[21] Appl. No. 698,311
[22] Filed Jan. 16, 1968
[45] Patented June 28, 1971

[54] TRAILER WARNING DEVICE
 3 Claims, 3 Drawing Figs.
[52] U.S. Cl. ....................................................... 340/52
[51] Int. Cl. ......................................................... B60q 1/12
[50] Field of Search ........................................... 340/52

[56] References Cited
UNITED STATES PATENTS
2,214,161 9/1940 Cater............................. 340/52
2,927,310 3/1960 Knapp........................... 340/52

Primary Examiner—John W. Caldwell
Assistant Examiner—Howard S. Cohen
Attorney—Ralph Burch ABSTRACT: A warning device is provided for use with a conventional trailer hitch. It includes a plate securable to the trailer hitch and a pair of arms adjustable within arcuate slots in the plate. The ends of the arms are provided with signal actuating devices. The signal is actuated by contact with the trailer hitch drawbar to warn the vehicle operator that the trailer and vehicle are dangerously close to each other.

Patented June 28, 1971

3,588,809

INVENTOR
Archibald S. Devlin
BY
Ralph Burch
ATTORNEY

TRAILER WARNING DEVICE

This invention relates generally to a signalling warning device and more particularly to a signalling warning device attached to a trailer hitch to warn the operator of a vehicle that a trailer attached thereto is dangerously close to the vehicle making a turn and that continued turning could result in damages to either the vehicle or trailer or to both.

The main object of the invention is therefore the provision of a device which, when attached to a trailer hitch, warns the operator of the vehicle, when making a turn that the corners of both the vehicle and trailer are dangerously close to each other and that additional or continued turning could result in damages to the trailer or vehicle or both.

By one broad aspect of this invention, there is provided for attachment to a trailer hitch having a ball joint secured to the vehicle and a drawbar for a trailer, a warning device to warn operators of vehicles hauling trailers that the vehicle and the trailer are dangerously close to each other when the vehicle is making a turn, the warning device comprising: a plate for securement to the trailer hitch; a pair of arms, each arm being pivotally mounted to the plate at a respective point equidistant from the center of the plate; means for adjusting the apparent length of each arm by pivoting each arm about its pivot point while a member secured to the arm is guided within an arcuate slot in the plate and preventing further pivoting by fixing the secured member in position in the arcuate slot; and signal actuating means mounted at the extremity of each arm.

The arms are adjustable for the following reason: The length of the drawbars vary from one trailer to another. Hence, by making the arms adjustable in apparent length, the same vehicle may be used to haul various trailers.

Figure 1:
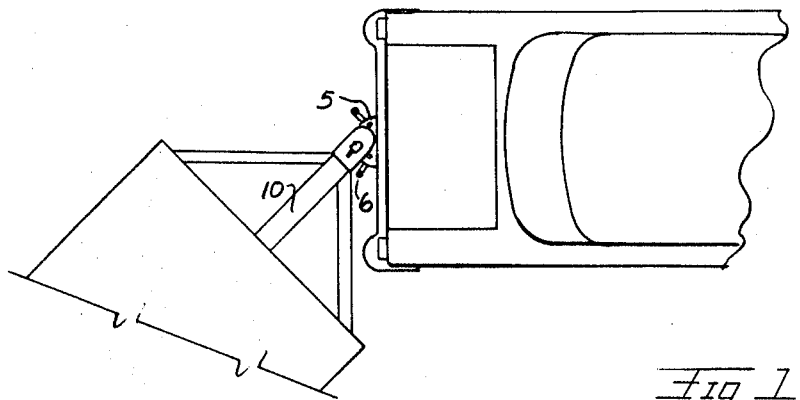
FIG. 1, is a plan view of a vehicle and trailer provided with the warning device according to an embodiment of the invention shown in turning motion.
Figure 2:
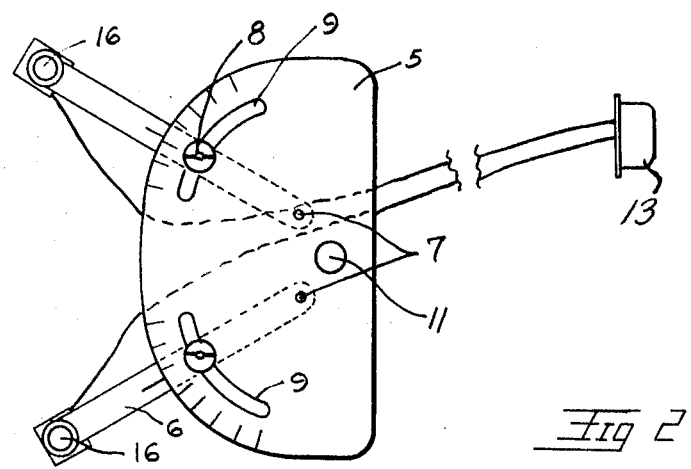
FIG. 2, is a plan view of warning device of one embodiment of this invention.
Figure 3:
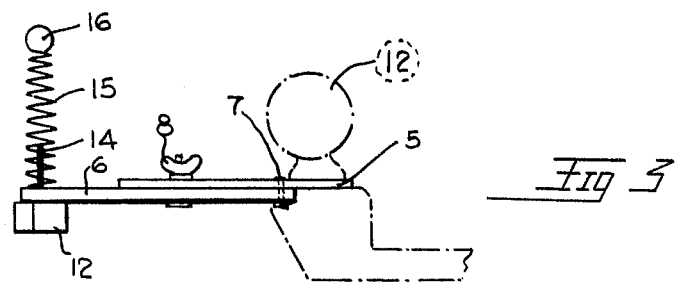
FIG. 3, is a side elevational view of warning device of the embodiment of the invention shown in FIG. 2 showing it mounted on a trailer hitch, the hitch shown in a chain dotted line.

Referring more in detail to the drawing in which similar reference characters designate corresponding parts throughout the several views it will be seen the invention consists of a semicircular plate 5 provided with a pair of adjustable arms 6. The arms 6 are equidistantly spaced apart from the center of said plate and are secured thereto at their inner extremity 7 by means of a rivet or other similar securing means. The arms are adjustably held at the outer edge of said plate by means of a bolt and thumb nut 8 which operates in an arcuate slot 9 to adjust said arm closer or farther apart from each other depending upon the length of the drawbar 10 by means of which a trailer is hauled. The plate 5 is provided with a mounting hole 11 and is mounted directly beneath the ball joint 12 on the stud to which the ball is threaded.

At the outer extremity of each arm 6, the invention provides a toggle switch 12a which is electrically connected to a buzzer 13, or other signalling device, through the electrical circuit of the vehicle. The toggle switch is provided with a long switching arm 14 which is surrounded by a coil spring 15 and terminates by a ball 16 at the uppermost extremity thereof.

In operation, the plate 5 is mounted on the stud directly below the ball 12 of the trailer hitch to which said ball is threadably secured. The drawbar is then attached in position and the arms 6 are adjusted so that the signal operates when the trailer and vehicle are relatively close to each other when making a turn, such as illustrated in FIG. 1 of the accompanying drawing.

When the vehicle is in motion and the operator makes a turn, should the turn be sharper that the adjustment set on the device, the coil spring 15 will be contacted by the draw bar 10 and will press against the switching arm 14 of the toggle switch which will cause the signalling device to warn the operator of the vehicle that the adjusted distance between trailer and vehicle has been exceeded and that continued turning could result in damages to the vehicle or trailer or both.

While the preferred embodiment has been disclosed, it is to be understood that minor modifications may be resorted to without departing from the spirit of the invention.

The embodiments of the invention in which an exclusive property or privilege is claimed are defined as follows:

I claim:

1. For attachment to a trailer hitch having a ball joint secured to the vehicle and a drawbar for a trailer, a warning device to warn operators of vehicles hauling trailers that the vehicle and the trailer are dangerously close to each other when the vehicle is making a turn, said warning device comprising: a plate for securement to said trailer hitch; a pair of arms, each arm being pivotally mounted to said plate at a respective point equidistant from the center of the plate; means for adjusting the apparent length of each said arm by pivoting each said arm about its pivot point while a member secured to said arm is guided within an arcuate slot in said plate and preventing further pivoting by fixing said secured member in position in said arcuate slot; and signal actuating means mounted at the extremity of each said arm.

2. A device as claimed in claim 1 wherein said plate comprises a semicircular plate formed with arcuate slots, and wherein said secured member comprises a bolt and thumb nut adjustably to secure said arms to said plate.

3. A device as claimed in claim 1 wherein said signal actuating means comprises a toggle switch mounted underneath said arm having its operating lever protruding through said arm at the outer extremity thereof, a coil spring mounted over said lever to press thereagainst when said spring comes in contact with said drawbar, to warn the vehicle operator that the trailer and vehicle are dangerously close to each other.